United States Patent Office 2,972,568
Patented Feb. 21, 1961

2,972,568
PROCESS FOR THE MICROBIOLOGICAL REDUCTION OF STEROIDS WITH STREPTOMYCES

Albert Wettstein and Ernst Vischer, Basel, Switzerland, assignors to Ciba Pharmaceutical Products, Inc., Summit, N.J.

No Drawing. Filed July 13, 1959, Ser. No. 826,429
Claims priority, application Switzerland Aug. 1, 1958
12 Claims. (Cl. 195—51)

The present invention provides a process for the selective reduction of the 3-keto grouping and/or the 4:5-double bond of steroid compounds by microbiological methods.

The reduction of oxo groups and carbon-to-carbon double bonds in steroid compounds by means of micro-organisms has been practiced for some time past. According to the experience collected to date with yeast and other micro-organisms (such as Streptomyces, Rhizopus, Curvularia species and others) the course taken by the reduction achieved depends on the organism used and also largely on the constitution of the steroid involved. Thus, in general, when yeast or another micro-organism is used, the $\Delta^4$-3-oxo group is not reduced. While androstane-3:17-dione is reduced to the $3\beta:17\beta$-diol, no reduction at all occurs in the case of pregnane-3:20-dione and allopregnane-3:20-dione. When, however, the last-mentioned compounds contain an oxo group in the 11-position, reduction to the $3\alpha$-alcohol occurs. In the presence of an 11-hydroxyl group the course taken by the reduction depends on whether the pregnane compound concerned belongs to the normal- or to the allo-series and whether the 11-hydroxyl group is in the $\alpha$- or $\beta$-position. 17- and/or 21-hydroxyl groups, on the other hand, seem to impede the reduction, while in the case of androstane compounds containing a 17-oxo group the latter is invariably reduced to the $17\beta$-hydroxyl group.

The present invention provides a new strain of the genus Streptomyces which is capable of reducing in a $\Delta^4$-3-ketone of the androstane or pregnane series the 3-oxo group to the $3\beta$-hydroxyl group, accompanied by elimination of the 4:5-double bond and formation of a 5-saturated compound of $5\alpha$-configuration, while other reducible groupings contained in the molecule—for example oxo groups in the 17- or 20-position—escape reduction.

Intermediates formed in the course of the reduction are $5H\alpha$-3-ketones which can be isolated and reduced to the $3\beta$-alcohols by further reduction with the same organisms. Thus, the present invention provides inter alia a process for the partial selective reduction of $\Delta^4$-androstene-3:17-diones and $\Delta^4$-pregnene 3:20-diones, as well as of the corresponding compounds that are saturated in the 5-position and are of the $5\alpha$-configuration, to the corresponding 5-saturated $3\beta$-hydroxy-compounds.

Apart from the substituents mentioned above, the starting materials may contain further substituents, more especially a free or functionally converted hydroxyl or oxo group in the 11, 16, 17, 18, 19 and/or 21-position, as well as halogen atoms, for example in the 9-or 12-position. The term androstane and pregnane compounds covers also compounds of the nor- and homo-series, for example $\Delta^4$-3-oxo-19-nor-pregnenes or -androstenes, or $\Delta^4$-D-homo-3-oxo-19-nor-pregnenes or -androstenes. They may also contain further double bonds, for example in the 9:11-, 14:15- and/or 16:17-position. As specific starting materials may be mentioned, for example, cortexone, progesterone, 16$\alpha$-hydroxy-progesterone, pregnenolone, corticosterone, cortisone, hydrocortisone and androstenedione.

The Actinomycetes strain of the present invention is a new strain of *Streptomyces griseus* which has been isolated from a soil specimen collected near La-Tour-de-Peilz, Canton Vaud. It is being kept under reference number 7994 at the Institute for Special Botany in the Federal Institute of Technology, Zurich.

The organism is distinguished by:

(1) Morphology of the spores in an electron microscope: ellipsoid, smooth.

(2) Color of the air mycelium: to begin with chalk-white or white-yellow, when fully grown yellowish-greenish grey.

(3) Color of the substratum mycelium: white-yellow-brownish yellow-deep yellow, on potatoes deep red-yellow.

(4) Color of the soluble pigment: on none of the nutrient media was a conspicuous soluble pigment formed.

(5) Melanin formation: According to the method of Ettlinger et al. (Ettlinger, L., Corbaz, R. and Hütter, R.: Zur Systematik der Actinomyceten 4. Eine Arteinteilung der Gattung Streptomyces Waksman et Henrici, Arch. Mikrobiol., 31, 326 (1958)) the strain was investigated in respect to its capacity to form melanin; it is chromogenically negative.

(6) Morphology of the spore chains: spore chains in sympodially branched clusters with short main axis; branches straight or wavy.

The growth of this fungus is little affected by temperature; it develops equally well at 18° and at 40° C., though there is an optimum between 25 and 32° C.

To further characterise the Streptomyces strain 7994 its growth on various nutrient media is described below. The nutrient media 1 to 5 were prepared as described by W. Lindenbein in Arch. Mikrobiol. 17, page 361 [1952].

(1) Synthetic agar: Growth point-like to veil-like to begin with, later wrinkly, whitish yellow to brownish yellow; air mycelium dusty, forming a fine coating, chalk-white.

(2) Synthetic solution: Growth as flakes and sediment, pale yellow; sparse surface growth with little chalk-white air mycelium; substratum pale yellow.

(3) Glucose agar: Growth wrinkly, pale brownish yellow; no air mycelium.

(4) Glucose-asparagine-agar: Growth thin, veil-like to wrinkly, brownish-yellow; air mycelium velvety, to begin with chalk-white to white yellow, when fully grown yellowish-greenish grey.

(5) Calcium malate-agar: Growth thin, veil-like, sometimes only point-like, white yellow to pale yellow; air mycelium only very sparse.

(6) Potatoes: Growth lichen-like, dark red-yellow; air mycelium sparse; substratum greenish jet black to brownish pitch black.

(7) Carrots: Growth thin to begin with, veil-like later a little lichen-like, white-yellow.

(8) Litmus milk: Annular growth and wrinkly pellicules, grey-blue to pale brown; peptonization, but no coagulation; litmus red.

(9) Starch plate: Growth thin, veil-like, pale yellow to deep yellow; air mycelium velvety, white yellow; hydrolysis after 8 days 2 mm.

(10) Gelatine stab (18° C.): Growth sparse, pustular, pale brown; liquefaction sparse and slow.

Insofar as the fungus described above is concerned, the present invention is not limited to the use of the Streptomyces strain 7994 or to any other strain covered by the description; it covers also the use of variants of these organisms such as are obtained, for example, by selection or mutation, more especially under irradiation with ultra-violet or X-rays or by treatment with nitrogen-mustard oils.

Accordingly, the new process consists in treating a Δ⁴-3-oxo-androstene or -pregnene compound, or a corresponding 5-saturated derivative thereof with 5α-configuration, under conditions such as are known for microbiological reduction, with an aerobic culture of the strain 7994 of the genus Streptomyces or of an enzyme produced thereby. In general, the starting material is incubated directly with a culture of the afore-mentioned strain grown under aerobic conditions. The culture is advantageously agitated, that is to say shaken or stirred, and contains assimilable carbon, more especially a carbohydrate, and if desired also a growth promoting substance such, for example, as corn steep liquor or beer wort, and inorganic salts. Accordingly, natural synthetic or semisynthetic nutrient solutions are equally suitable. The process which is simplest to perform in actual practice is described hereinbelow without limiting the invention thereto: The organism is grown in an apparatus and under conditions similar to those known in the manufacture of antibiotics as the so-called deep-tank process. The temperature is advantageously kept between 25 and 32° C., and under these conditions the culture takes 1–3 days to develop fully. The starting material is then added under sterile conditions in a fine dispersion or solution—for example in methanol, ethanol, acetone, dioxane or propylene glycol—and incubation is continued. In general, the reaction is complete after 8 to 36 hours. The mycelium is filtered off and, if desired extracted, for example with methanol or acetone, and the evaporated extract is added to the culture filtrate; it is extracted with a suitable solvent such as ethyl acetate, chloroform, ethylene chloride or methylene chloride, the extract is washed with dilute sodium bicarbonate solution and water and finally evaporated to dryness in vacuo. From the crude reduction product obtained in this manner the products of the present process can be isolated in the pure state by one of the conventional purification methods such as crystallization, chromatography, fractional elution, distribution between immiscible solvents, or the like. Alternatively, the reduction can be performed by first isolating the active enzyme from an appropriate aerobic culture of the strain 7994 of the genus Streptomyces and using it after having been freed from the growing culture.

By reducing the time of incubation of the starting material with the afore-mentioned organisms, or the appropriate enzymes there may be isolated from the reduction products, apart from unreacted starting material and the 3β-alcohols saturated in the 5-position, the 5-saturated androstane-3-ketones or allopregnane-3-ketones respectively which are formed as intermediates. In some cases, for example when progesterone or cortexone is reduced, further low-polar compounds of unknown constitution can be detected in paper-chromatographic examination. In the case of progesterone it was possible to isolate and examine this by-product. As revealed by its infra-red spectrum, it contains an unconjugated carbonyl group but no hydroxyl group.

The process of the present application is a significant advance in the synthesis of various valuable steroids having physiological action, for example in view of the fact that in the partial reduction of Δ⁴-3:17-dioxo-androstene or Δ⁴-3:20-dioxo-pregnene compounds to the 3β-alcohols, performed with chemical means, other reducible groupings present in the molecule—for example the 20-keto group—may have to be protected under certain circumstances, as well as in view of the further fact that such chemical hydrogenations do not always take a stereospecific course. The present process thus enables the recently described sodiuretic factor from suprarenal glands—allopregnane-3β:16α-diol-20-one—to be obtained in a single reduction stage from 16α-hydroxy-progesterone:

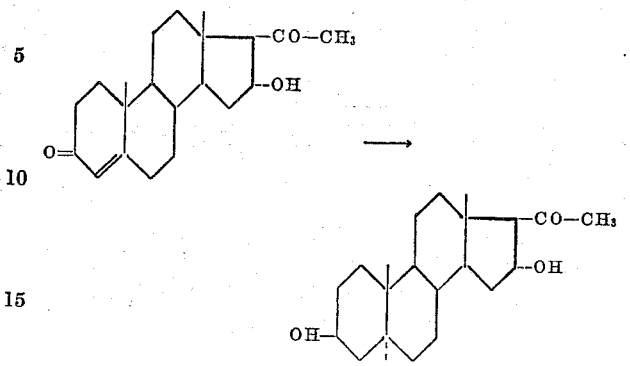

The following examples illustrate the invention:

Example 1

4 liters of a nutrient solution are prepared that contains per liter of tap water 10 grams of crude glucose, 5 grams of peptone, 3 grams of meat extract, 5 grams of sodium chloride and 10 grams of calcium carbonate; this solution is adjusted to pH=7.5, introduced into a shaking vessel, sterilized for 30 minutes at 118° C., and then inoculated with a culture of the strain 7994 and shaken at 27° C. After 3 days the well-developed culture is treated under sterile conditions with a solution of 1 gram of cortexone in 20 cc. of acetone, and the mixture is shaken under identical conditions for another 36 hours. The mycelium is then filtered off and extracted twice with warm acetone. The combined acetonic extracts are concentrated in vacuo and the concentrate is added to the culture filtrate which latter is then extracted three times with 500 cc. of ethyl acetate on each occasion. The extracts are washed three times with 100 cc. each of sodium bicarbonate solution of 2% strength and water, combined, dried over sodium sulfate and evaporated in vacuo. The residue is dissolved in 80 cc. of methanol, and 100 cc. of petroleum ether and 20 cc. of water are added. The methanolic-aqueous phase and the petroleum ether phase are separately evaporated in vacuo and subjected to paper chormatographic examination. The latter phase contains only oily impurities but not steroids, whereas the former consists mainly of 3β:21-dihydroxy-allopregnane-20-one which is purified by chromatography over 30 grams of silica gel with the use of the following solvents: chloroform; mixtures of chloroform and acetone of increasing acetone content; finally acetone. A 99:1 mixture of chloroform+acetone elutes the bulk of the substance adsorbed by the column, the 3β:21-dihydroxy-allopregnane-20-one. After crystallization from acetone +petroleum ether it melts at 168–174° C.

Example 2

As described in Example 1, 1 gram of cortexone is added to 4 liters of a culture of strain 7994. The whole is shaken for 8 hours at 27° and then further processed as described in Example 1. As revealed by its paper-chromatogram the crude product contains—apart from cortexone (II) and a by-product which appears in the paper-chromatogram underneath cortexone—mainly 21-hydroxy-allopregnane-3:20-dione (I) and 3β:21-dihydroxy-allopregnane-20-one (III). The three substances can be separated by chromatography over 30 grams of silica gel with solvents mentioned in Example 1 (fractions of 100 cc. each) as follows:

| Fraction | Solvent | contains |
| --- | --- | --- |
| 1 | Chloroform | impurities. |
| 2–3 | do | I. |
| 4 | do | |
| 5–6 | do | mixture of I+II. |
| 7–8 | chloroform+acetone (99:1) | II.<br>III. |

21-hydroxy-allopregnane-3:20-dione is crystallized from a mixture of acetone and petroleum ether; it melts at 162–164° C.

Example 3

A solution of 1 gram of progesterone in 20 cc. of acetone is added under sterile conditions to 4 liters of a culture of strain 7994 prepared as described in Example 1. The culture vessel is shaken for 8 hours at 27° C., and the batch is processed as described in Example 1. The crude extract is distributed as described between petroleum ether and aqueous methanol of 80% strength, evaporated, and the residues of the petroleum ether phase and the methanol phase are subjected to paper-chromatographic examination. Apart from a small amount of progesterone, the petroleum ether phase contains an unknown substance which appears underneath progesterone in the paper-chromatogram. The methanolic phase is revealed to contain progesterone and the afore-mentioned unknown substance as well as allopregnane-3:20-dione and 3β-hydroxy-allopregnane-20-one. The residue of the methanolic phase (0.958) is dissolved in a little methylene chloride and poured over a column of 30 grams of silica gel. The column is eluted with methylene chloride, mixtures of methylene chloride and acetone of rising acetone content, and with acetone. The fractions thus obtained (25 cc. of solvent each) are separately evaporated and subjected to paper-chromatographic examination. The first three fractions (methylene-chloride) contain the afore-mentioned unknown substance in unitary form; it is crystallized from acetone and melts at 149–150° C. It displays no absorption at 240 mμ. Its infrared spectrum contains inter alia bands at $5.87\mu$, $7.24\mu$, $7.38\mu$, $8.48\mu$, $8.82\mu$, $9.15\mu$, $9.53\mu$ and $11.50\mu$. Fractions 5–8 (methylene chloride) yield allopregnane-3:20-dione (M.P. 204–206° C.), and from fractions 17–18 (methylene chloride) and 19–22 (methylene chloride-acetone 99:1) 3β-hydroxy-allopregnane-20-one (M.P. 192–195° C.) can be isolated.

Example 4

8 Erlenmeyer flasks of 500 cc. capacity are charged with 100 cc. each of the nutrient solution described in Example 1; the solutions are sterilized, inoculated with a culture of strain 7994 and shaken for 3 days at 28° C. The well-developed cultures are then treated under sterile conditions with solutions of 30 mg. each of the following steroids in 1.5 cc. of acetone: Progesterone, 16α-hydroxy-progesterone, pregnenolone, corticosterone, 17α-hydroxy-cortexone (Reichstein's substance S), cortisone, hydrocortisone and androstene-dione. The cultures are shaken for another 14 hours and then individually extracted with 2 portions of ethyl acetate of 30 cc. each. The extracts obtained from the individual cultures are separately evaporated and subjected to paper-chromatographic examination. All of them contain, apart from a little starting material, a mixture of the corresponding 3-keto- and 3β-hydroxy-allopregnane or -androstane compounds respectively.

What is claimed is:

1. Process for the selective reduction of 3-keto grouping and of the 4:5-double bond of steroid compounds, wherein a member selected from the group consisting of $\Delta^4$-3-oxo-androstenes and $\Delta^4$-3-oxo-pregnenes and corresponding derivatives, saturated in the 5-position with 5α-configuration is subjected to the action of enzymes from aerobic cultures of the strain 7994 of the genus Streptomyces.

2. Process as claimed in claim 1, wherein the starting materials are incubated directly with cultures of the strain 7994 of the genus Streptomyces growing under aerobic conditions, and the reduction products are isolated from the fermentation broth by extraction with organic, water-immiscible solvents, and subsequent crystallization.

3. Process as claimed in claim 1, wherein the mycelium is separated from cultures of the strain 7994 of the genus Streptomyces grown under aerobic conditions, the starting materials are added to the culture filtrate and, after carrying out the reduction the solution is extracted with an organic, water-immiscible solvent, and the reduction products isolated by crystallization.

4. Process as claimed in claim 2, wherein prepurification of the crude extract obtained is carried out before crystallization by distribution between solvents.

5. Process as claimed in claim 2, wherein prepurification of the crude extract obtained is carried out before crystallization by chromatographic absorption.

6. Process as claimed in claim 1, wherein the starting materials are incubated for about 8 hours and the 5Hα-3-keto-steroids saturated in the 5-position are isolated.

7. Process as claimed in claim 1, wherein the starting materials are incubated for about 36 hours and the 5Hα-3β-hydroxy-steroids saturated in the 5-position are isolated.

8. Process as claimed in claim 1, wherein cortexone is used as starting material.

9. Process as claimed in claim 1, wherein progesterone is used as starting material.

10. Process as claimed in claim 1, wherein 16α-hydroxy-progesterone is used as starting material.

11. Process as claimed in claim 1, wherein a member selected from the group consisting of pregnenolone, corticosterone, 17α-hydroxy-corticosterone, cortisone, hydrocortisone and androstene-dione is used as starting material.

12. Process as claimed in claim 9, wherein the substance melting at 149–150° C. and having the following bands in the infrared spectrum $5.87\mu$, $7.24\mu$, $7.38\mu$, $8.82\mu$, $9.15\mu$, $9.53\mu$ and $11.50\mu$ is isolated.

References Cited in the file of this patent

UNITED STATES PATENTS

| | | |
|---|---|---|
| 2,833,694 | Prelog | May 6, 1958 |
| 2,841,531 | Wettstein et al. | July 1, 1958 |